(12) United States Patent
Li

(10) Patent No.: US 7,353,982 B2
(45) Date of Patent: Apr. 8, 2008

(54) DIFFUSION BONDING FOR METALLIC MEMBRANE JOINING WITH METALLIC MODULE

(75) Inventor: Anwu Li, Vancouver (CA)

(73) Assignee: Membrane Reactor Technologies Ltd., Vancouver, BC (CA)

( * ) Notice: Subject to any disclaimer, the term of this patent is extended or adjusted under 35 U.S.C. 154(b) by 703 days.

(21) Appl. No.: 10/720,529

(22) Filed: Nov. 25, 2003

(65) Prior Publication Data

US 2005/0109821 A1    May 26, 2005

(51) Int. Cl.
   *B23K 20/00*        (2006.01)
(52) U.S. Cl. .................... 228/193; 228/220; 228/234.1
(58) Field of Classification Search ........ 228/218–220, 228/205, 193, 194
   See application file for complete search history.

(56) References Cited

U.S. PATENT DOCUMENTS

| | | | | |
|---|---|---|---|---|
| 3,428,476 A | * | 2/1969 | Myers et al. ................ | 427/229 |
| 3,648,355 A | * | 3/1972 | Shida et al. ................. | 228/187 |
| 4,313,013 A | | 1/1982 | Harris | |
| 4,982,893 A | * | 1/1991 | Ruckle et al. ............... | 228/220 |
| 5,165,591 A | | 11/1992 | Pratt | |
| 5,595,337 A | * | 1/1997 | Demaray et al. ........... | 228/193 |
| 5,904,754 A | * | 5/1999 | Juda et al. ..................... | 96/11 |
| 6,073,830 A | * | 6/2000 | Hunt et al. .................. | 228/203 |
| 6,183,543 B1 | | 2/2001 | Buxbuam | |
| 6,405,761 B1 | * | 6/2002 | Shimizu et al. ............. | 138/109 |
| 6,458,189 B1 | | 10/2002 | Edlund et al. | |
| 6,464,129 B2 | * | 10/2002 | Stueber et al. .............. | 228/194 |
| 6,555,778 B1 | * | 4/2003 | Barnett ................... | 219/121.45 |
| 6,582,499 B2 | | 6/2003 | Frost et al. | |
| 2003/0190486 A1 | * | 10/2003 | Roa et al. .................... | 428/469 |
| 2004/0232211 A1 | * | 11/2004 | Kayser et al. .............. | 228/193 |

FOREIGN PATENT DOCUMENTS

| | | |
|---|---|---|
| EP | 1 184 125 A1 | 3/2002 |
| GB | 2 355 418 A | 4/2001 |
| SU | 1197998 A1 | 12/1985 |

OTHER PUBLICATIONS

Flanagan, et al., "Hydrogen-induced rearrangements in Pd-rich alloys", Journal of Alloys and Compounds 293-295 (1999) 161-168, ELSEVIER.

Guoge, et al., "Microstructure of the interface of a solid state diffusion bond between Inconel alloy 718 and 17-4 PH stainless steel", J. Mat. Sc. Lett. 20, (2001) 1937-1940.

* cited by examiner

*Primary Examiner*—Kiley Stoner
(74) *Attorney, Agent, or Firm*—Oyen Wiggs Green & Mutala LLP

(57) ABSTRACT

This invention relates to a method of bonding a metallic membrane with metallic part involving pressing a smooth surface of the metallic membrane against the smooth surface of the metallic part, and heating the metallic membrane and metallic part to a temperature above the half melting point of the metallic membrane while subjecting the metallic membrane and metallic part to a controlled environment of a proper gas atmosphere. The metallic membrane can comprise palladium and the pressurized gas can comprise one of hydrogen, an inert gas or their mixture.

8 Claims, 5 Drawing Sheets

DIFFUSION BONDING FOR METALLIC MEMBRANE JOINING WITH METALLIC MODULE

TECHNICAL FIELD

The invention relates to fabrication of joints between metal components, particularly between metallic membranes and metallic modules.

BACKGROUND

As new materials are developed, it is advantageous to be able to weld or otherwise join the new material to itself or to already existing materials. Achieving satisfactory joint quality is an important milestone in a research and development scheme for any new material as satisfactory joint quality increases the likelihood that the new material can be used for widespread applications.

The production, separation and purification of hydrogen is an important industrial process, in part due to a continuing and increasing demand for hydrogen in electronic, fuel cell and chemical industries. Metallic membranes having high permselectivity, such as palladium (Pd) based membranes, are extensively used in the research and development of hydrogen production and separation. Even though Pd-silver (Ag) alloy foil or tube membranes are commercially available on a large scale, application of Pd—Ag membranes and foils encounter obstacles due to the lack of a satisfactory technique for joining the Pd—Ag alloy to normal metallic modules, such as to a stainless steel reactor or a separation cell.

Methods of joining thin metallic membranes with metallic modules, such as stainless steel, have been attempted in the past with varying degrees of success. Argon arc welding is generally unsatisfactory for welding thin Pd-based membranes with metallic modules because the high temperatures required for argon arc welding cause distortion and degrade or destroy the strength, ductility, and other metallurgical properties of the membrane. The high welding temperature can cause the membrane to be oxidized. The welded area can experience a hydrogen embrittlement problem. Hydrogen embrittlement is a process resulting in a decrease of the toughness or ductility of a metal due to the presence of atomic hydrogen.

Electronic beam welding is a more localized technique which produces little heat and can be used for more accurate micro-welding. However, when electronic beam welding is used to join a membrane with metallic module, micro-cracks in and near the welding area are often present that can cause leakage over time.

Brazing is another method that has been employed to join metallic membranes with metallic parts. A brazing filler of copper (Cu)—Ag has been used by us for joining Pd—Ag alloy membranes with stainless steel. The melting point of Cu—Ag alloy is high (>780° C.) and the Cu—Ag brazing filler can damage to the Pd—Ag alloy membrane.

U.S. Pat. No. 4,313,013 to Harris discloses attaching a tubular specimen of Pd—Ag alloy to stainless steel using a gold (Au) brazing filler. The melting point of Au is high (1064.43° C.) and can damage the Pd—Ag alloy.

Pd—Ag alloy foils are commercially available through cold-working. Thermal treatment of cold-worked alloys at high temperatures can cause significant boundary growth. High temperatures can also facilitate the concentration of impurities in the boundary area. Both boundary growth and concentration of impurities in the boundary area can lead to the formation of defects, which reduce the selectivity and longevity of the membrane. Accordingly, there exists a need to be able to use a lower temperature for joining.

When a brazing filler alloy having a lower melting point is used, some of the materials having a low melting point in the filler will vaporize and then deposit on the surface of the membrane. This contaminates the membrane during brazing or during subsequent use of the membrane at high temperatures in hydrogen.

U.S. Pat. No. 6,183,543 to Buxbuam discloses an apparatus for hydrogen purification. Buxbuam discloses that a leaking alloy tube membrane may be sealed by welding, soldering or brazing, and indicates that tubes can be sealed by high temperature cement or adhesive.

U.S. Pat. No. 6,458,189 to Edlund et al. discloses a membrane attached by contact adhesive to a screen. Flexible graphite gaskets can be used for connecting two or more membrane envelopes. Edlund et al. further disclose use of brazing, gasketing and welding as means for joining metal modules.

To obtain a gas-tight seal by graphite, a fitting head for tubular membrane sealing or a flange for planar membrane sealing is required. The fitting head or the flange occupy a large space compared to the size of the seal. Instability of the graphite in oxidizing or steam environments and difficulty making a gas-tight graphite make this method difficult to scale up.

Diffusion bonding techniques have been used in the aerospace industry to join similar or different members. It is often used in combination with superplastic forming for the fabrication of aircraft and aerospace components [see: D. V. Dunford and P. G. Portridge, *Journal of Materials Science*, 1987, 22, 1790-1798].

Zhang Guoge et al. in the *Journal of Materials Science Letters* 20, 2001, 1937-40 reported a diffusion bonding technique to bond Inconel alloy 718 with 17-4 PH stainless steel. Zhang Guoge et al. disclose a method of diffusion bonding using a constant temperature of 1000° C., which is too high for use with a Pd—Ag membrane.

U.S. Pat. No. 5,904,754 to Juda et al. discloses the diffusion bonding of copper at pressures of 1 atmosphere or less. Juda et al. disclose applying and controlling physical pressure by the torque load on four flange bolts. Furnace temperatures of between 200° C. and 350° C. are disclosed. Juda et al. disclose that copper badly deforms under gas pressure above about 200° C. Juda et al. teach that when carbon steel and stainless steel do not lend themselves to diffusion bonding unless they are coated with copper in which case the bonding takes place by copper migration.

SUMMARY OF INVENTION

This invention relates to a method of bonding a metallic membrane with metallic module that involves pressing a smooth surface of the metallic membrane against a smooth surface of metallic parts, then heating the metallic membrane and metallic parts to a temperature above the half melting point of the metallic membrane, while subjecting the metallic membrane to a controlled environment of pressurized gas. The mechanical pressing can be in the range of 100 psig to 10,000 psig, and preferably in the range of about 1,000 psig to about 3,000 psig.

The heating of the metallic membrane and metallic parts to a temperature above the half melting point of the metallic membrane is to a temperature of between 500° C. and 1,100° C.

The metallic membrane can comprise palladium.

The metallic membrane can be 75%/wt Pd-25%/wt Ag alloy or Pd—Ru alloy.

The mechanical pressing, the heating and the subjecting to a gas environment can be carried out for at least 4 hours, 5 hours, about 24 hours, about 30 hours, or even longer, depending on the condition used.

The gas can comprise one of hydrogen, an inert gas, such as argon, or a mixture thereof.

The method of bonding a first metal object to a second metal object can also comprise: mechanically pressing a surface of the first metal object against a surface of the second metal object; and heating the first and second metal objects above the half melting point of one of the first and second metal objects, while being subjected to a gas atmosphere.

The method can further comprise: polishing the surface of the first metal object; and polishing the surface of the second metal object prior to the mechanical pressing.

BRIEF DESCRIPTION OF DRAWINGS

In Figures which illustrate non-limiting embodiments of the invention.

DESCRIPTION

Figure 1:
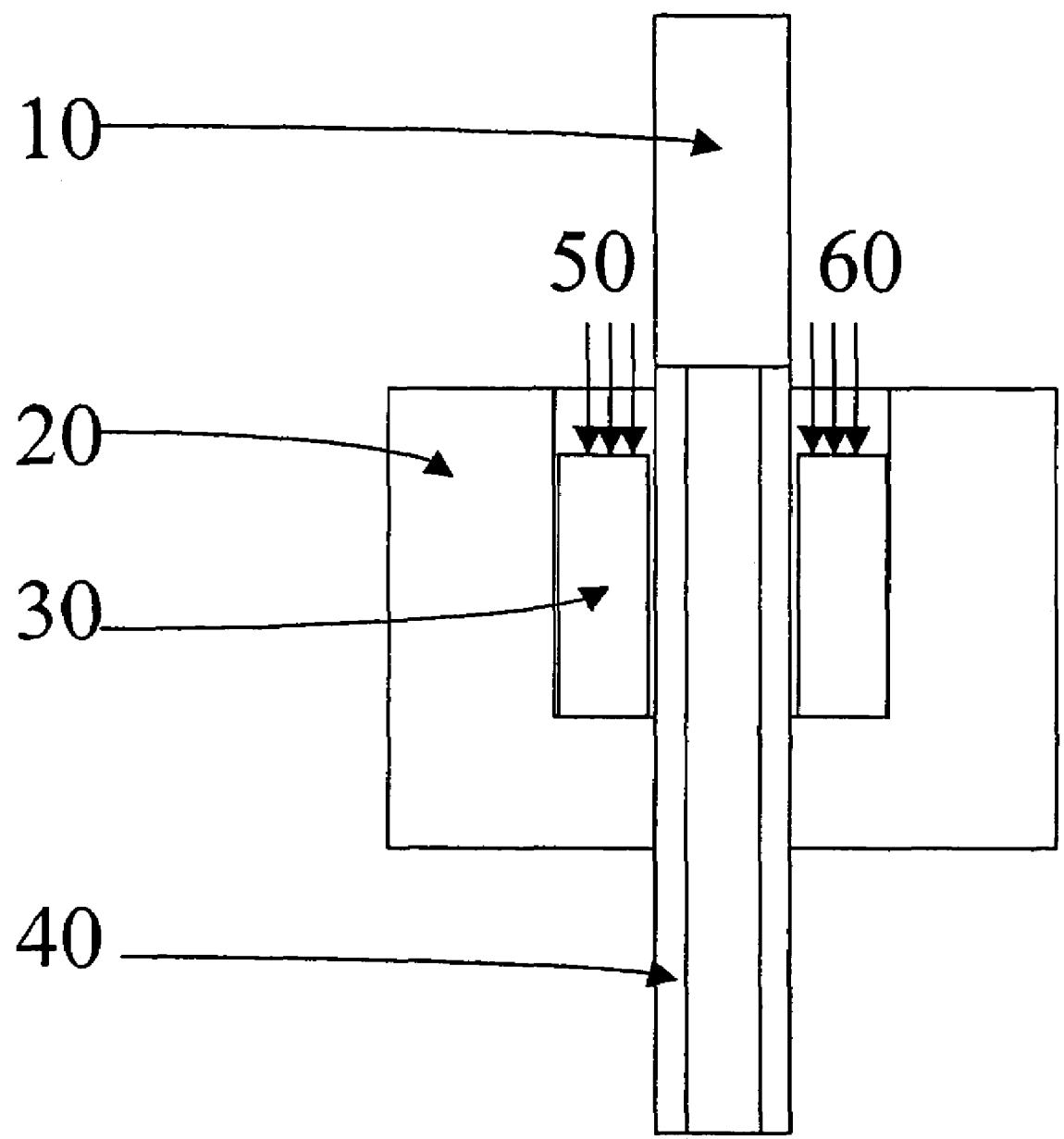
FIG. 1 is a cross-sectional view of a diffusion bonding apparatus.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Diffusion bonding is a solid-state joining process wherein joining is accomplished without the need for a liquid interface, as in brazing, and without the creation of a case product through melting and re-solidification, such as occurs with welding.

This invention provides a method for joining metallic membranes with solid metallic module parts. The metallic membrane can be planar, tubular or any other shape. The membrane can be Pd-based or another hydrogen-permeable membrane. The metallic module parts can be stainless steel, alloy or another metal.

This diffusion bonding technique can be performed in an inert environment or in the presence of hydrogen, the latter being reduction assisted metallic bonding (RAMB). RAMB is achieved by forming a diffusion bond between a metallic membrane and a metallic module, with the presence of hydrogen. Diffusion bonding generally occurs at the temperature of 0.5-0.8 melting point (in Kelvin) of the materials to be joined. For example, for Pd—Ag alloy (75-25%/wt), its half melting point is about 566° C.

Membranes can be joined by diffusion bonding with metallic modules at a lower temperatures than 566° C., however, the joining process may be very slow. Experimental results on diffusion bonding of Pd-based foil with metallic modules have found that the presence of hydrogen can facilitate the inter-diffusion between metals. In the presence of hydrogen, strong bonding occurs between Pd-based foil and stainless steel at a temperature between 600-650° C. and within a reasonable time scale. An increase in smoothness of the metallic surfaces, and an increased physical pressure applied to the area to be bonded aids the joining process.

A smooth base metal surface, mechanical pressing of the metals to be joined, an inert atmosphere or vacuum and appropriate temperature are four paramenters of diffusion bonding in an inert environment according to this invention. A smooth base metal surface, mechanical pressure, hydrogen presence and appropriate temperature are four parameters of the RAMB technique.

The invention is based on the inter-diffusion of atoms between the two metals to be joined. Inter-diffusion can take place only when the two metals are in direct physical contact. In order to increase the contacting area between metals, a smooth surface is required. Where the surface smoothness of the base metal is not satisfactory, the desired smoothness can be obtained by polishing. After a metal surface has been polished with an increasing grade of sand paper, the surface becomes smooth and shiny. A smooth surface reduces or eliminates any non-contacting areas between the two metal surfaces to be bonded. This allows otherwise non-contacting areas to be brought into contact during mechanical pressing and heating.

To form a bond, it is necessary for two metal surfaces to come into contact at the atomic level. Appropriate strong mechanical pressing can cause micro-deformation of metals and can lead to an increase in the area of contact. Strong mechanical pressure facilitates the inter-diffusion.

As stated above, the presence of hydrogen can increase the mobility of metal atoms and can increase the rate of inter-diffusion between the two metal surfaces. While diffusion bonding according to this invention can take place in an inert environment, the presence of hydrogen can allow diffusion bonding to be achieved at lower temperature or within a shorter period of time.

Selecting an appropriate temperature is important for micro-deformation and for inter-diffusion. The mobility of metallic atoms becomes significant at a temperature higher than half of its melting point (in Kelvin).

The joining temperature for welding is usually above the melting point of the metals to be joined. The temperature for brazing is higher than the melting point of the brazing materials. Those temperatures are often between 800° C. and 1600° C. and are too high for joining a Pd—Ag alloy membrane. High temperatures will lead to significant boundary growth and to the concentration of impurities in boundary areas for a Pd—Ag alloy. This can cause defects or pin-holes, reducing the selectivity and longevity of the Pd—Ag alloy membrane. Because those temperatures are close or higher than the melting point of Ag, the Ag near the Pd—Ag alloy surface will vaporize, reducing the Ag content near the surface. That in turn reduces the hydrogen permeability of the Pd—Ag alloy membrane. This was confirmed by an Energy Dispersive X-Ray (EDX) analysis of a Pd—Ag alloy sample brazing at 900° C.

This invention makes use of an inter-diffusion phenomenon encountered when porous metallic modules are used to support a Pd-based membrane. By taking steps which favor the inter-diffusion between Pd-based alloy and metallic modules, such as polishing their surfaces and employing high mechanical pressing to increase contacting area of metals, and optimally presenting an inert environment or hydrogen to increase the mobility and diffusion rate of metallic atoms. The combination of these steps allow the joining temperature to be lowered to about 600° C. or even lower, which is the typical temperature range for a fluidized-bed membrane reactor (FBMR)—steam methane reforming (SMR). The bonding formed according to this invention is very strong. Experimental results to date have not found any leaks at high temperature and pressure, even in the SMR environment.

There is no limitation on the membrane shape. The metallic membrane can be planar, tubular or any other shape. This provides flexibility for various applications of membrane.

No additional materials, such as brazing material, are required to obtain diffusion bonds. This prevents contamination from the use of brazing materials. For example, the copper in brazing material may vaporize and deposit on the surface of a Pd-based membrane during brazing, reducing the permeability of membrane. Moreover, the Cu in brazing may be oxidized in the SMR environment, perhaps leading to the failure of the brazed joint.

The invention can be practiced in-situ of permeation testing, which can be cost-effective.

This invention is easy to scale up, which is beneficial for the commercialization of the FMBR-SMR technique.

FIG. 1 shows an alloy tube 10 having an outside diameter of approximately ⅛" and a thickness of 50 μm. The alloy tube 10 is placed over a ⅛" stainless steel tube 40. A graphic ferrule 30 is placed inside a Conax flange 20. Mechanical pressure is applied to the graphite ferrule 30 in the direction of arrows 50 and 60. The pressure applied to the graphite ferrule 30 causes an increase in pressure between the alloy tube 10 and the stainless steel tube 40.

EXAMPLE 1

Joining a tubular alloy of 75%/wt Pd and 25%/wt Ag membrane 10 with stainless steel tube 40. A 6" long ⅛" outside diameter Pd—Ag alloy tube 10 with a thickness of 50 μm was used to join to a ⅛" standard stainless steel 316 tube 40 on one end. The surface of the joining part of the stainless steel tube 40 was polished to remove the oxide layer and contaminants, and to enable it to properly fit in the tube side of the Pd—Ag alloy 10, as shown in FIG. 1. A Conax 20 was used to provide mechanical pressing. By tightening the Conax 20, the plug pushed the graphite ferrule 30, which in turn pressed the alloy tube 10 against the outside surface of the stainless steel tube 40. The entire apparatus was placed in a vessel that was baked at 650° C. for approximately 30 hr under 15 psig hydrogen. The apparatus was removed from the vessel after proper cooling. The stainless steel was tightly bonded to the Pd—Ag alloy tube and could not be torn apart, even after cooling.

Figure 2:
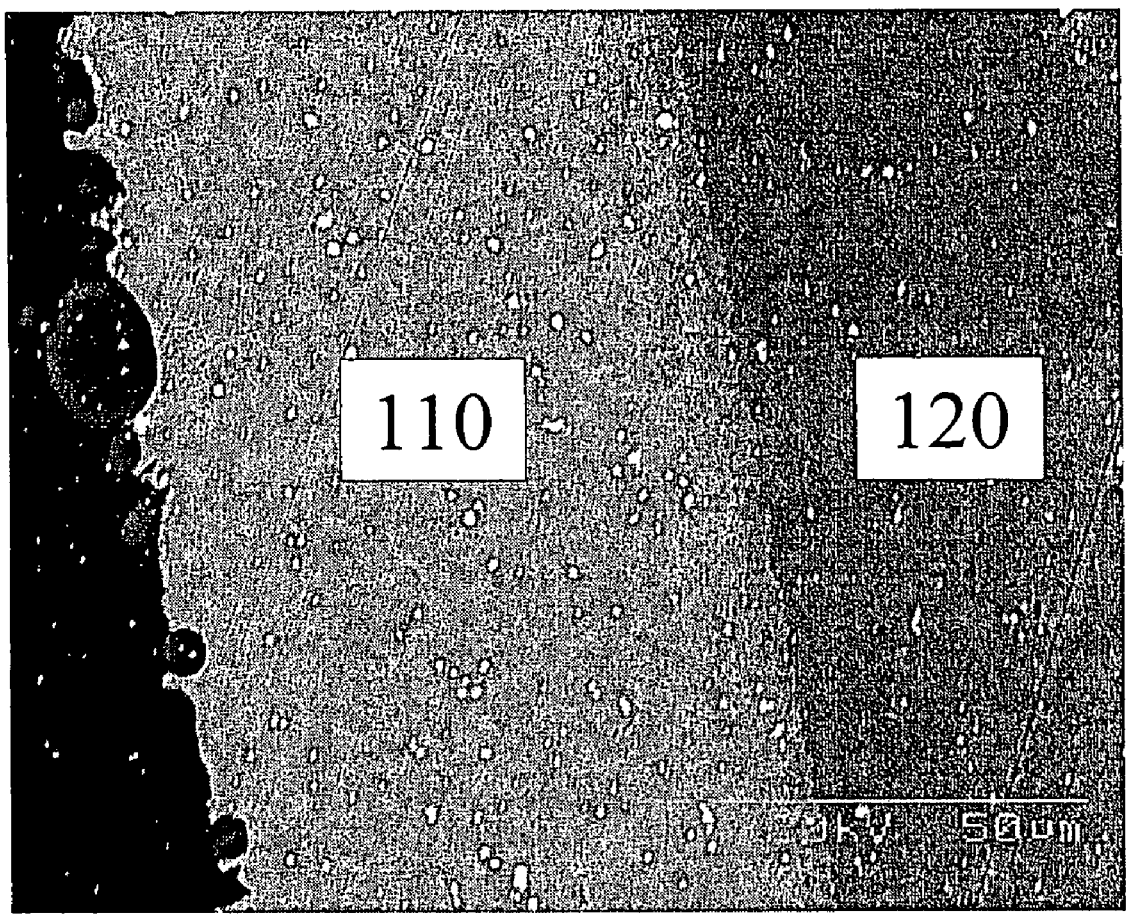
FIG. 2 is a scanning electron microscope view of a cross-section of tubular Pd—Ag alloy diffusion bonded to a stainless steel tube.

A gas tightness testing experiment was conducted to assess the joints created by this method. The non-bonded end of the alloy tube 10 was sealed with the Conax 20 and the tube was supported. The joined membrane tube was put into a vessel which can withstand high pressure at high temperature. After cycling the joined membrane in hydrogen three times between 200° C. and 650° C. and four times in helium between room temperature and 650° C., the bonds remain gas tight in helium with 250 psig in shell side pressure and 0 psig in tube side at 650° C. These results indicate that the bonding is very strong and gas-tight. A Scanning Electron Microscope (SEM) picture of this bond is shown in FIG. 2. FIG. 2 shows a cross section of tubuler Pd alloy 110 after diffusion bonding with a stainless steel tube 120. The SEM-energy dispersive x-ray (EDX) analysis indicates that a strong inter-diffusion occurred between Pd and the stainless steel tube along the interface, indicating metal bonding between Pd and stainless steel base.

Figure 3:
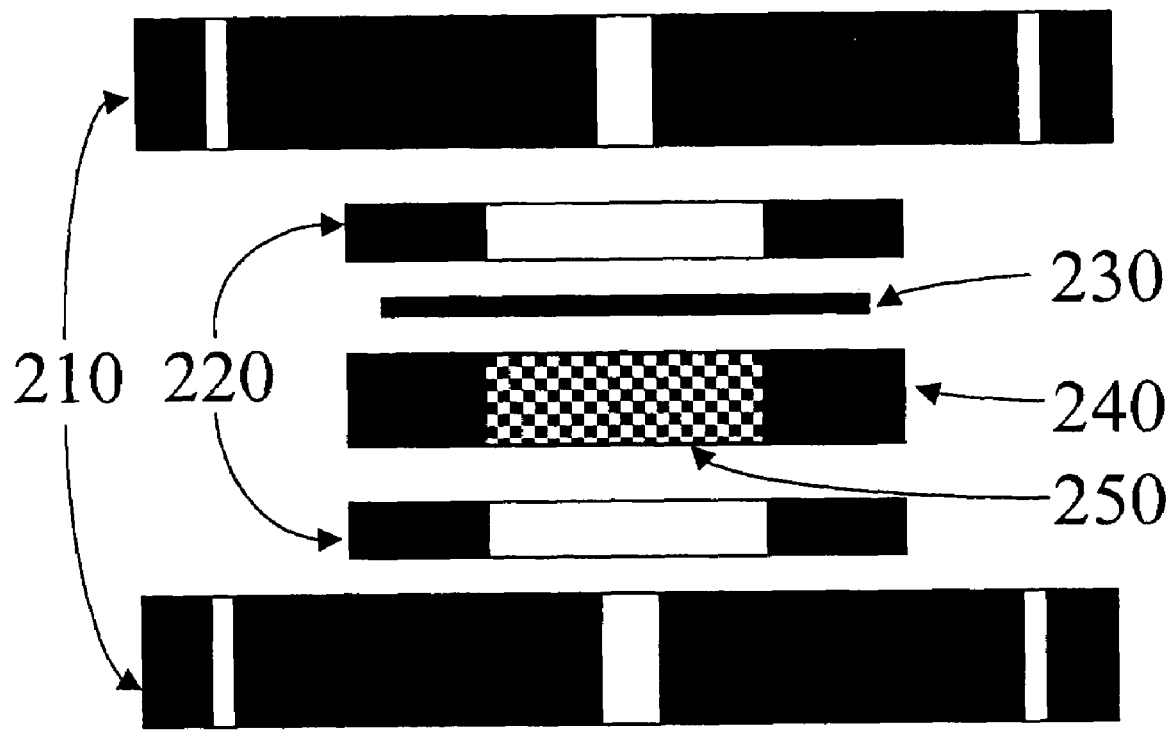
FIG. 3 is an exploded cross-sectional view of a diffusion bonding apparatus for bonding a Pd—Ru alloy disk with a stainless steel wafer.

FIG. 3 shows an exploded cross-sectional view for bonding a Pd—Ru disk 230 with a 304 stainless steel wafer 240. Stainless steel flanges 210 are sandwiched on the outside of two graphite gaskets 220. A membrane substrate 250 is shown within the 304 stainless steel wafer 240.

EXAMPLE 2

Joining a circular Pd-5%/wt Ru alloy disc 230 with a stainless steel wafer 240. The process was performed with a stainless steel 304 wafer 240 having an outside diameter of 2", an inside diameter of 1" and a thickness of ¹⁄₁₆" was punched from a sheet. One surface of the wafer 240 was polished with grit 600 sandpaper and then buffered and cleaned. A Pd-5%/wt Ru alloy disk 230 with a diameter of 1.75" and a thickness of 50 μm was placed on the cleaned surface. After compression with up to 3000 psig mechanical pressure through the flanges by torque load as shown in FIG. 3, the apparatus was baked in a vessel at 650° C. for 24 hr under 15 psig hydrogen. After properly cooling down, the joined disk was taken out and welded with a stainless steel flange 320 to form a membrane module as shown in FIG. 4, where the membrane foil was properly supported by a porous substrate.

Figure 4:
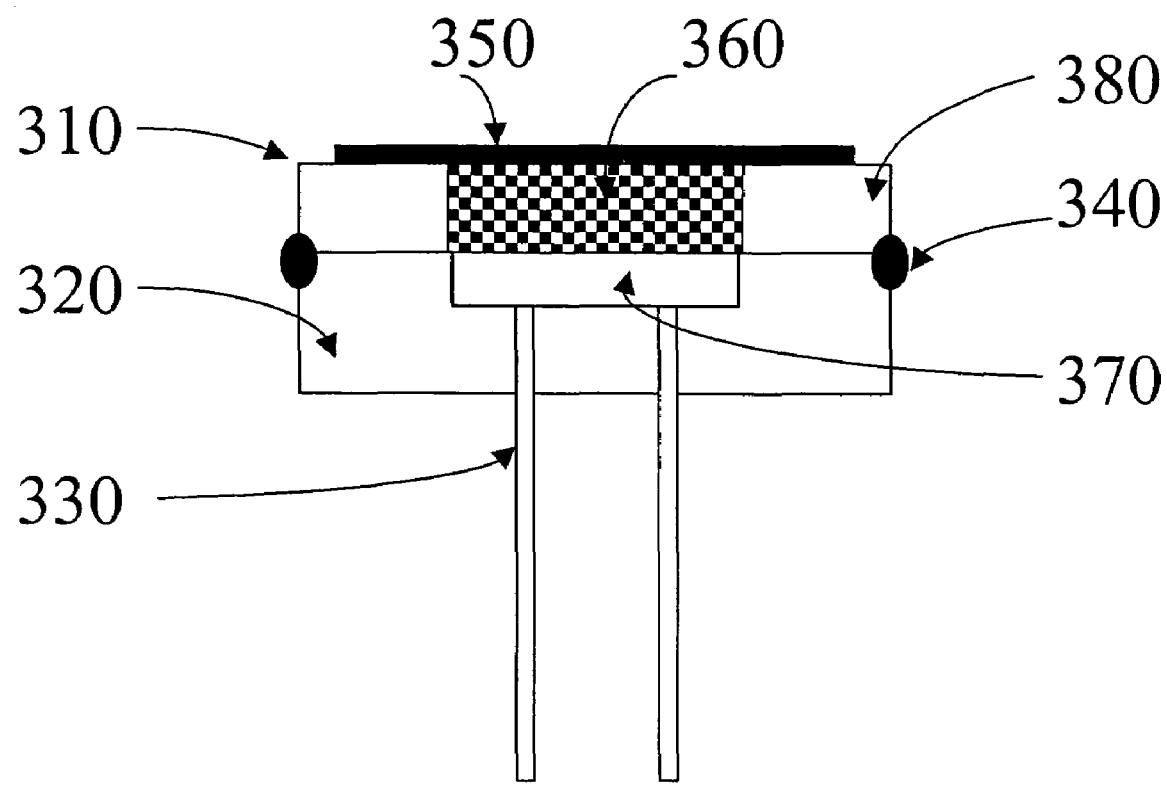
FIG. 4 is a cross-sectional view of a Pd—Ru alloy after diffusion bonding.

FIG. 4 is a cross-sectional view of a Pd—Ru alloy membrane module 310 after diffusion bonding with a stainless steel tube 330. The Pd—Ru alloy membrane module 310 is attached to a stainless steel flange 320 by a welded joint 340. A Pd—Ru alloy membrane foil 350 is set atop the Pd—Ru alloy membrane module 310, the 380 stainless steel wafer and the 360 porous metallic substrate, which in turn is above a permeation chamber 370.

The membrane was tested with 120 psig of $He/H_2$ (60:40) mixture on the feed side and 0 psig on the permeation side at 600° C. 100% pure hydrogen was achieved in permeation side and no helium was detected with gas chromatography (GC), where argon was used as a carrier gas. This module was further tested with 90 psig on the feed side and 0 psig in permeation side using a gas mixture (3% CO, 12% $CO_2$, 15% $CH_4$, 30% $H_2$ and 40% steam) at 550° C. for up to 6 months. No impurities were detectable with GC. These experiments implied that the joining of membrane foil with stainless steel is strong and durable under various conditions.

Figure 5:
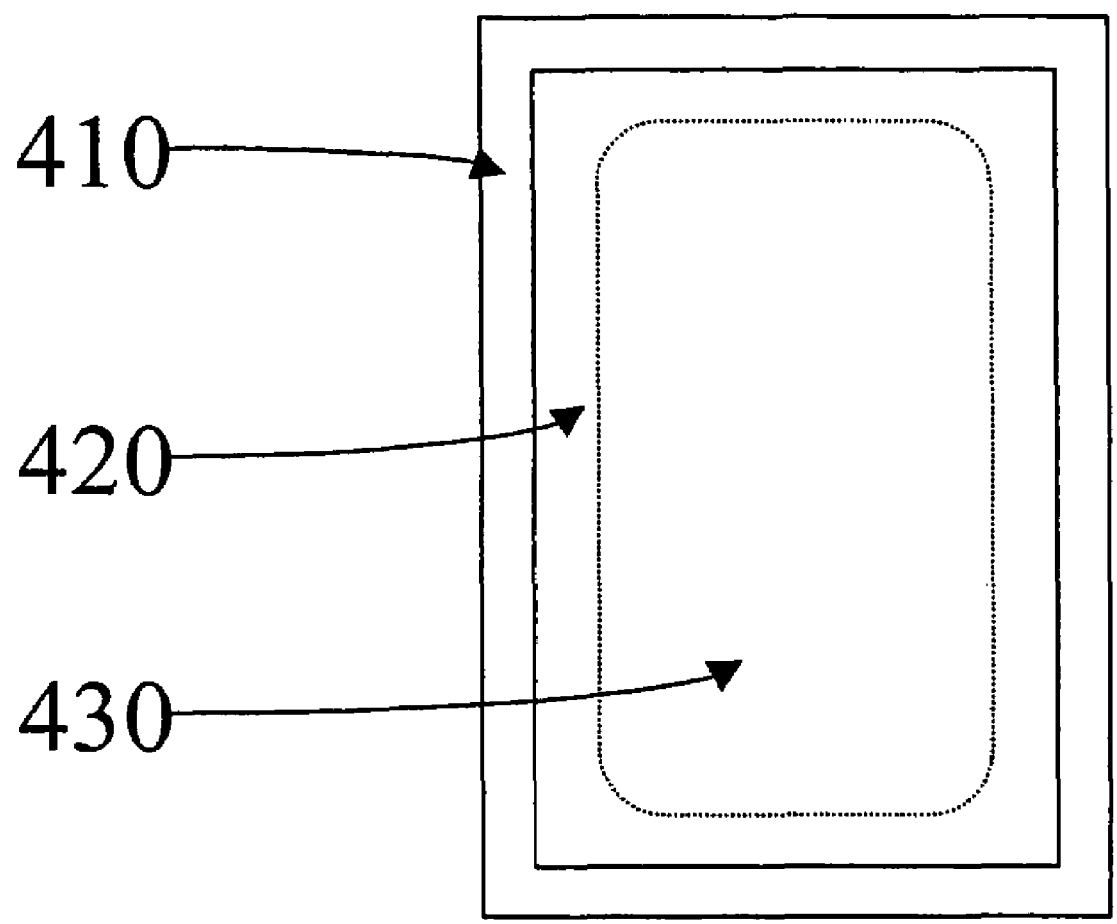
FIG. 5 is a plan view of a Pd sheet bonded to an alloy 625 frame.

FIG. 5 shows a Pd sheet 420 with an alloy 625 (nickel-based) frame 410. The Pd sheet 420 has dimensions of 3"×6"×47 μm and the alloy frame 410 has dimensions of 3.25"×6.25"×¹⁄₁₆". A hole 430 is punched in the Pd sheet 420, the hole 430 having dimensions of 2"×5" with rounded corners.

EXAMPLE 3

Joining a Pd sheet 420 with a stainless steel frame. A 3.25" by 6.25" stainless steel 304 sheet with a thickness of ¹⁄₁₆" with a cut away rectangle 430 in its middle to form a frame 410 whose width is 0.625", as shown in FIG. 5. One surface of the sheet was polished with grit 600 sandpaper and then buffered and cleaned. A 3"×6" palladium sheet with a thickness of 47 μm was placed on the cleaned surface. After properly compressed up to 3000 psig mechanical press, the apparatus was baked in a vessel at 650° C. for 24 hr under 15 psig hydrogen. After properly cooling down, the joined parts were taken out and welded to a stainless steel flange to form a membrane module, where the membrane foil was supported by a porous substrate. The bond withstood strength and gas-tight testing as described in example 1.

EXAMPLE 4

Joining a circular 75%/wt Pd-25%/wt Ag alloy disc with a stainless steel wafer at a higher temperature for a shorter time. A similar joining method was used as in example 1 except that membrane foil was 75%/wt Pd-25%/wt Ag alloy and that the bonding process was carried out at 700° C. for 5 hr. The bond withstood strength and gas-tight testing as described in example 1.

EXAMPLE 5

Joining a circular 75%/wt Pd-25%/wt Ag alloy disc with a stainless steel wafer in the absence of hydrogen and at a higher temperature. A similar joining method was used as in example 4 except that argon, instead of hydrogen, was used in the bonding vessel and the bonding process was carried out at 700° C. for 30 hr. The bond withstood strength and gas-tight testing as described in example 1.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of bonding a metallic membrane with a metallic part comprising:
    directly physically contacting a smooth surface of a metallic membrane comprising palladium against a smooth surface of the metallic pan without any intervening material being present between the two contacting surfaces and mechanically pressing the metallic membrane and the metallic part together at a pressure in the range of about 1,000 psig to about 3,000 psig;
    heating the directly physically contacting metallic membrane comprising palladium and the metallic part to a temperature above the half melting point of the metallic membrane while subjecting the metallic membrane and metallic part to a controlled environment of a reducing gas atmosphere.

2. The method of claim 1 wherein the heating to a temperature above the half melting point is to a temperature between 450° C. and 1100° C.

3. The method of claim 1 wherein the metallic membrane is 75%/wt Pd-25%/wt Ag alloy.

4. The method of claim 1 wherein the metallic membrane is Pd—Ru alloy.

5. The method of claim 1 wherein the mechanical pressing, the heating and the subjecting to a reducing gas atmosphere are carried out for about 24 hours.

6. The method of claim 1 wherein the mechanical pressing, the heating and the subjecting to a reducing gas atmosphere are carried out for about 30 hours.

7. The method of claim 1 further comprising:
    polishing the surface of the metallic membrane; and
    polishing the surface of the metallic part prior to the mechanical pressing.

8. The method of claim 1 wherein the reducing gas is hydrogen at a pressure of 15 psig.

* * * * *